US012533879B2

(12) United States Patent
Nakayama

(10) Patent No.: US 12,533,879 B2
(45) Date of Patent: Jan. 27, 2026

(54) HEAD CHIP, LIQUID JET HEAD, AND LIQUID JET RECORDING DEVICE

(71) Applicant: SII Printek Inc., Chiba (JP)

(72) Inventor: Hitoshi Nakayama, Chiba (JP)

(73) Assignee: SII Printek Inc., Chiba (JP)

( * ) Notice: Subject to any disclaimer, the term of this patent is extended or adjusted under 35 U.S.C. 154(b) by 166 days.

(21) Appl. No.: 18/536,983

(22) Filed: Dec. 12, 2023

(65) Prior Publication Data

US 2024/0198669 A1 Jun. 20, 2024

(30) Foreign Application Priority Data

Dec. 16, 2022 (JP) ................................ 2022-201242

(51) Int. Cl.

*B41J 2/14* (2006.01)
*B41J 2/16* (2006.01)
*B41J 2/175* (2006.01)

(52) U.S. Cl.

CPC ......... *B41J 2/14201* (2013.01); *B41J 2/1609* (2013.01); *B41J 2/17546* (2013.01); *B41J 2/14032* (2013.01); *B41J 2/14209* (2013.01); *B41J 2002/14491* (2013.01); *B41J 2/1632* (2013.01); *B41J 2202/10* (2013.01)

(58) Field of Classification Search

CPC .... B41J 2/14201; B41J 2/1632; B41J 2/1609; B41J 2002/14491; B41J 2202/10; B41J 2/14209; B41J 2/14032; B41J 2/17546

See application file for complete search history.

(56) References Cited

U.S. PATENT DOCUMENTS 4,584,590 A * 4/1986 Fischbeck ............ B41J 2/14233 310/333
2020/0180311 A1* 6/2020 Nakayama ............. B41J 2/1623
2023/0191783 A1* 6/2023 Nakayama ............. B41J 2/1632 347/68

FOREIGN PATENT DOCUMENTS

JP 10-058674 A 3/1998
JP 7064649 5/2022

OTHER PUBLICATIONS

Search Report in European Application No. 23216477.2, dated Apr. 24, 2024 (7 pages).

* cited by examiner

*Primary Examiner* — Henok D Legesse
(74) *Attorney, Agent, or Firm* — Crowell & Moring LLP

(57) ABSTRACT

A head chip, a liquid jet head, and a liquid jet recording device which effectively transfer elastic energy to ink in a pressure chamber to increase pressure to be generated in the pressure chamber are provided. The head chip according to an aspect of the present disclosure includes an actuator plate provided with a pressure chamber in which a liquid is contained, a jet hole plate which has a jet hole communicated with the pressure chamber, and which is overlapped on the actuator plate in a thickness direction of the actuator plate, and a drive electrode which is configured to generate an electric field in the actuator plate to thereby deform the actuator plate in the thickness direction and a crossing direction crossing the thickness direction to expand or contract a volume of the pressure chamber.

10 Claims, 15 Drawing Sheets

HEAD CHIP, LIQUID JET HEAD, AND LIQUID JET RECORDING DEVICE

RELATED APPLICATIONS

This application claims priority to Japanese Patent application No. JP2022-201242 filed on Dec. 16, 2022, the entire content of which is incorporated herein by reference.

BACKGROUND OF THE INVENTION

1. Field of the Invention

The present disclosure relates to a head chip, a liquid jet head, and a liquid jet recording device.

2. Description of the Related Art

A head chip to be installed in an inkjet printer is provided with a flow channel member provided with pressure chambers, and an actuator plate formed of a piezoelectric material which closes one surface of each of the pressure chambers (see, e.g., JPH10-58674A).

In the head chip of this kind, the volume of the pressure chamber is expanded or contacted by deforming the actuator plate due with an electric field generated in the actuator plate. Thus, by a pressure variation being generated in the pressure chamber, ink in the pressure chamber is ejected through a nozzle hole.

Recently, with the view of an increase in nozzle density, the width of a portion (a partition wall) of partitioning the pressure chambers adjacent to each other out of a cavity plate tends to be narrowed. When the width of the partition wall is narrowed, the rigidity of the partition wall decreases. In this case, there is a possibility that elastic energy generated due to the deformation of the actuator plate is absorbed by the deformation of the partition wall when ejecting the ink. In other words, in the related-art head chip, it is difficult to effectively transfer the elastic energy to the ink in the pressure chamber, and there is a room for improvement in the point of increasing the pressure to be generated in the pressure chamber.

The present disclosure provides a head chip, a liquid jet head, and a liquid jet recording device each capable of effectively transferring the elastic energy to the ink in the pressure chamber to increase the pressure to be generated in the pressure chamber.

SUMMARY OF THE INVENTION

In order to solve the problems described above, the present disclosure adopts the following aspects.

(1) A head chip according to an aspect of the present disclosure includes an actuator plate provided with a pressure chamber in which a liquid is contained, a jet hole plate which has a jet hole communicated with the pressure chamber, and which is overlapped on the actuator plate in a thickness direction of the actuator plate, and a drive electrode which is configured to generate an electric field in the actuator plate to thereby deform the actuator plate in the thickness direction and a crossing direction crossing the thickness direction to expand or contract a volume of the pressure chamber.

According to the present aspect, by forming the pressure chamber with the actuator plate, it is possible to prevent the elastic energy from being absorbed by the deformation of other members when the pressure in the pressure chamber changes due to the deformation of the actuator plate compared to when, for example, forming the pressure chamber in a separate member from the actuator plate. Thus, it is possible to effectively transfer the elastic energy to the ink in the pressure chamber to increase the pressure to be generated by the pressure chamber. Further, compared to when forming the pressure chamber in the separate member, it is possible to achieve an increase in manufacturing efficiency and a reduction in cost.

On that basis, in the present aspect, by the actuator plate being deformed by the drive electrode in the thickness direction and the crossing direction, it is possible to ensure the pressure to be generated compared to the configuration in which, for example, the actuator plate is deformed in only either one of the thickness direction and the crossing direction.

(2) In the head chip according to the aspect (1) described above, it is preferable that the drive electrode includes a first electrode formed on an inner surface of the pressure chamber, a second electrode which is adjacent in the crossing direction to the first electrode on a first surface of the actuator plate, the first surface facing to the jet hole plate, and which is configured to generate a potential difference from the first electrode, and a first opposed electrode which is disposed on a second surface of the actuator plate so as to be opposed in the thickness direction to the first electrode, the second surface facing to an opposite side to the jet hole plate side, and which is configured to generate a potential difference from the first electrode.

According to the present aspect, by generating the potential difference between the first electrode and the second electrode, it is possible to generate an electric field in a direction crossing a polarization direction of the actuator plate. Thus, by deforming the actuator plate in the crossing direction in the shear mode (the roof-shoot type), it is possible to change the volume of the pressure chamber. Further, by generating the potential difference between the first electrode and the first opposed electrode, it is possible to generate an electric field also in the polarization direction of the actuator plate. Thus, by deforming the actuator plate in the thickness direction in the bend mode (a bimorph type), it is possible to change the volume of the pressure chamber. In other words, by deforming the actuator plate in the thickness direction and the crossing direction in both of the shear mode and the bend mode, it is possible to increase the pressure to be generated in the pressure chamber when jetting the liquid.

(3) In the head chip according to the aspect (2) described above, it is preferable that the drive electrode includes a second opposed electrode which is adjacent to the first opposed electrode on the second surface, and which is disposed so as to be opposed to the second electrode in the thickness direction, and the second opposed electrode is configured to generate a potential difference in the thickness direction from the second electrode, and is configured to generate a potential difference in the crossing direction from the first opposed electrode.

According to the present aspect, since the first opposed electrode and the second opposed electrode are formed on the second surface of the actuator plate so as to be adjacent to each other, it is possible to deform the actuator plate in the shear mode due to the potential difference generated between the first opposed electrode and the second opposed electrode.

Further, it is possible to deform the actuator plate in the bend mode due to the potential difference generated between the second electrode and the second opposed electrode. As a result, it is possible to achieve a further increase in pressure to be generated, and power saving.

(4) In the head chip according to one of the aspects (2) and (3) described above, it is preferable that a groove part recessed in the thickness direction from the second surface is formed in a portion of the actuator plate, the portion being located at an outer side in the crossing direction with respect to the pressure chamber.

According to the present aspect, since the actuator plate deforms so that the volume of the groove part expands or contracts when applying the voltage to the drive electrode, it is possible to prevent the deformation of the actuator plate from being hindered. Thus, it becomes easy to ensure the amount of the deformation of the actuator plate, and thus it is possible to increase the pressure to be generated in the pressure chamber.

(5) In the head chip according to the aspect (4) described above, it is preferable that the groove part penetrates the actuator plate in the thickness direction.

According to the present aspect, since the groove part penetrates the actuator plate, it is easy to allow the deformation of the partition wall when jetting the liquid. Therefore, it is possible to increase the pressure to be generated by the pressure chamber.

(6) In the head chip according to one of the aspects (4) and (5) described above, it is preferable that the drive electrode includes an in-groove electrode which is formed on an inner surface of the groove part, and which is configured to generate a potential difference from the first electrode.

According to the present aspect, an electric field in a direction crossing a polarization direction is generated in the actuator plate due to the potential difference generated between the first electrode and the in-groove electrode. As a result, a thickness-shear deformation occurs in the partition walls so as to fall over outward in the crossing direction in a direction toward a second side in the thickness direction in the shear mode. Thus, when jetting the liquid, the partition wall deforms so that the volume of the groove part expands or contracts. In other words, since the groove part functions as a clearance part for allowing the deformation of the partition wall, it becomes easy to ensure an amount of deformation of the actuator plate, and thus, it is possible to increase the pressure to be generated by the pressure chamber.

(7) In the head chip according to any one of the aspects (4) through (6) described above, it is preferable that a polarization direction of the actuator plate is set as a direction different between the jet hole plate side with respect to a central portion in the thickness direction in the pressure chamber and an opposite side to the jet hole plate with respect to the central portion in the thickness direction, and the drive electrode is formed throughout an entire length in the thickness direction in the pressure chamber.

According to the present aspect, an electric field in a direction perpendicular to the polarization direction (the thickness direction) is generated in the actuator plate (the piezoelectric plates) due to the potential difference generated between the first electrode and the in-groove electrode. As a result, by the piezoelectric plates constituting the actuator plate making a thickness-shear deformation in the crossing direction in the shear mode, the partition wall makes a flexural deformation to form a V-shape from a central portion in the thickness direction of the pressure chamber. In other words, the partition wall deforms so that the volume of the pressure chamber expands. Thus, it becomes easy to ensure the amount of deformation in the crossing direction of the partition wall when applying the voltage, and it is easy to ensure the elastic energy of the actuator plate.

(8) In the head chip according to any one of the aspects (1) through (6) described above, it is preferable that a polarization direction of the actuator plate is set as one direction throughout an entire length in the thickness direction.

According to the present aspect, it is possible to achieve simplification of the configuration and the reduction in cost.

(9) A liquid jet head according to the present disclosure includes the head chip according to any one of the aspects (1) through (8) described above.

According to the present aspect, since the head chip according to the aspect described above is provided, it is possible to provide the liquid jet head which is capable of exerting the desired jet performance, and which is high in quality.

(10) A liquid jet recording device according to an aspect of the present disclosure includes the liquid jet head according to the aspect (9) described above.

According to the present aspect, since the liquid jet head according to the aspect described above is provided, it is possible to provide the liquid jet recording device which is capable of exerting the desired jet performance, and which is high in quality.

According to an aspect of the present disclosure, it is possible to effectively transfer the elastic energy to the ink in the pressure chamber to increase the pressure to be generated by the pressure chamber.

DETAILED DESCRIPTION OF THE PREFERRED EMBODIMENTS

Figure 1:
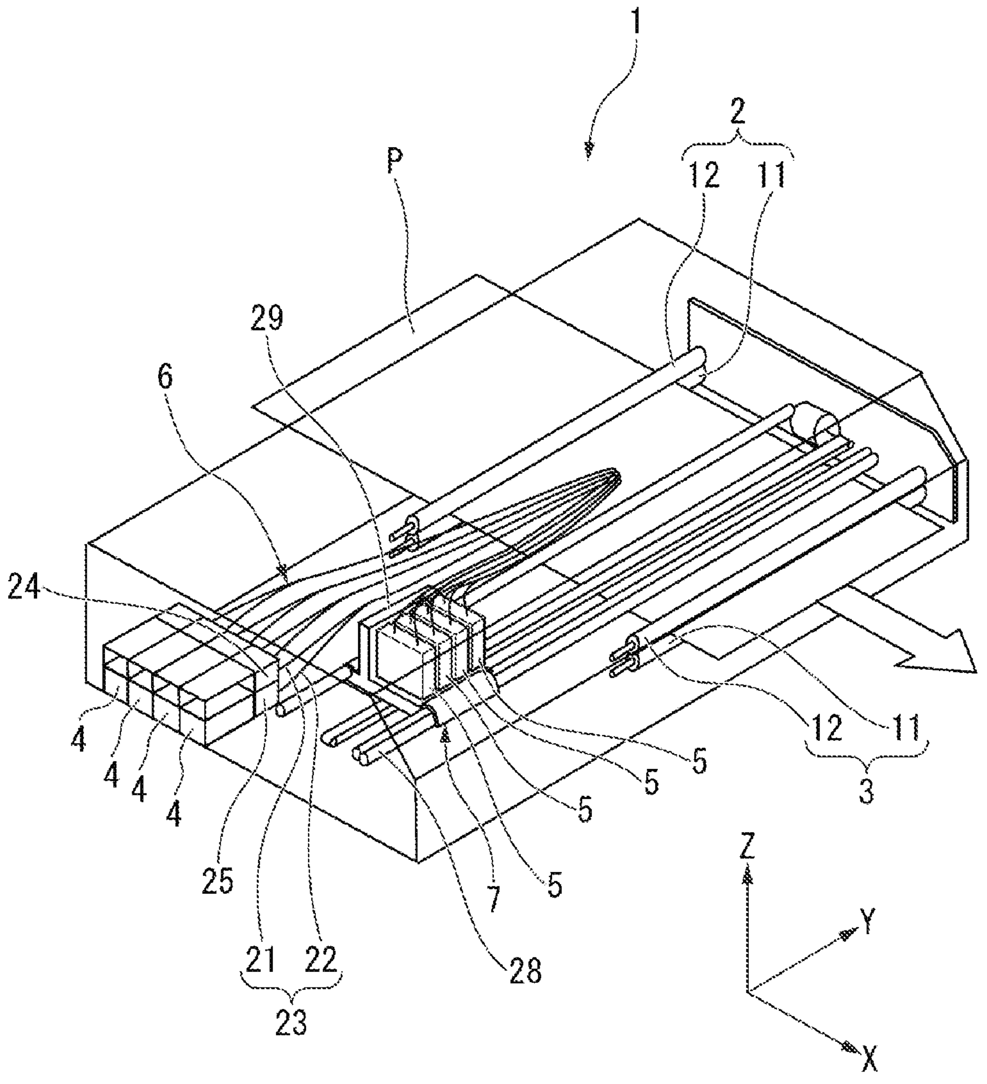
FIG. 1 is a schematic configuration diagram of an inkjet printer according to a first embodiment.

Some embodiments according to the present disclosure will hereinafter be described with reference to the drawings.

In the embodiments and modified examples hereinafter described, constituents corresponding to each other are denoted by the same reference symbols, and the description thereof will be omitted in some cases. In the following description, expressions representing relative or absolute arrangements such as "parallel," "perpendicular," "central," and "coaxial" not only represent strictly such arrangements, but also represent the state of being relatively displaced with a tolerance, or an angle or a distance to the extent that the same function can be obtained. In the following embodiment, the description will be presented citing an inkjet printer (hereinafter simply referred to as a printer) for performing recording on a recording target medium using ink (a liquid) as an example. The scale size of each member is arbitrarily modified so as to provide a recognizable size to the member in the drawings used in the following description.

First Embodiment

[Printer 1]

FIG. 1 is a schematic configuration diagram of a printer 1.

The printer (a liquid jet recording device) 1 shown in FIG. 1 is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

In the ink tanks 4, there are respectively contained four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink according to the ink tanks 4 coupled thereto.

Figure 2:
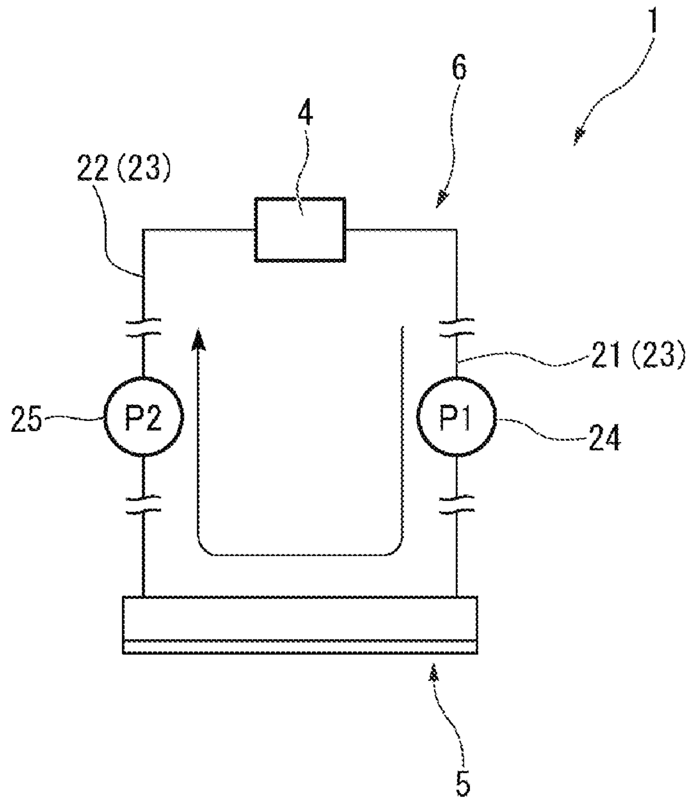
FIG. 2 is a schematic configuration diagram of an inkjet head according to the first embodiment and an ink circulation mechanism.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes the inside of the ink discharge tube 22 to suction the ink from the inkjet head 5 through the ink discharge tube 22. Thus, the ink discharge tube 22 side is provided with negative pressure with respect to the ink jet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, and a carriage 29 movably supported by the guide rail 28.

<Inkjet Heads 5>

The inkjet heads 5 are mounted on the carriage 29. In the illustrated example, the plurality of inkjet heads 5 is mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a control section (not shown) for applying drive voltages to the head chip 50.

<Head Chip 50>

Figure 3:
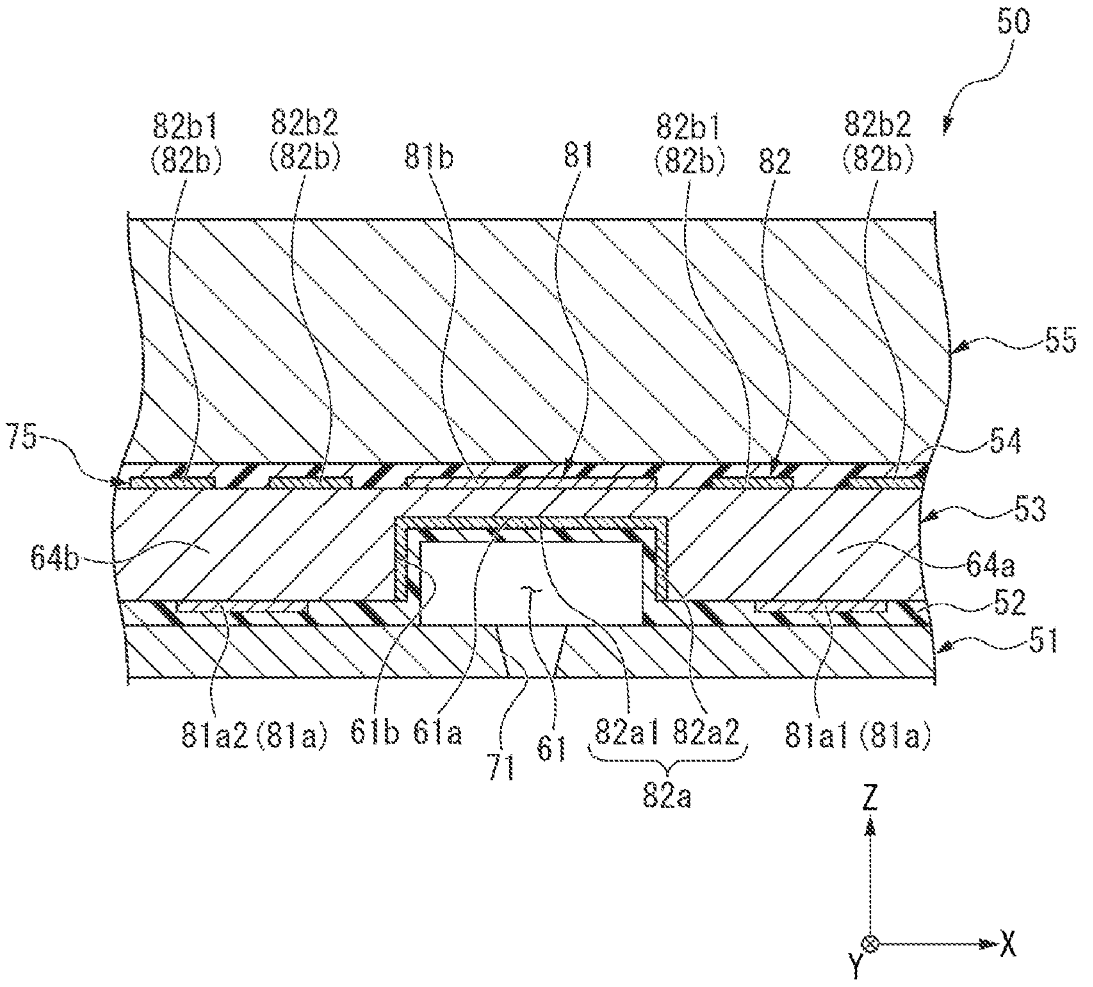
FIG. 3 is a cross-sectional view of a head chip according to the first embodiment.

FIG. 3 is a cross-sectional view of the head chip 50.

The head chip 50 shown in FIG. 3 is a so-called recirculating side-shoot type head chip 50 which circulates the ink with the ink tank 4, and at the same time, ejects the ink from a central portion in the extending direction (the Y direction) in a pressure chamber 61 described later. The head chip 50 is provided with a nozzle plate 51, a first film 52, an actuator plate 53, a second film 54, and a cover plate 55. In the following explanation, the description is presented in some cases defining a direction (+Z side) from the nozzle plate 51 toward the cover plate 55 along the Z direction as an upper side, and a direction (−Z side) from the cover plate 55 toward the nozzle plate 51 along the Z direction as a lower side.

The actuator plate 53 is arranged setting the Z direction as the thickness direction. The actuator plate 53 is formed of a piezoelectric material such as PZT (lead zirconate titanate). The actuator plate 53 is set so that the polarization direction faces to one direction toward the +Z side (a so-called monopole type). On both surfaces of the actuator plate 53, there are formed drive interconnections 75. The actuator plate 53 is configured so as to be able to be deformed by an electric field being generated by a voltage applied by the drive interconnections 75. It should be noted that the configuration of the drive interconnections 75 will be described later.

The actuator plate 53 is provided with common flow channels 60, and a plurality of pressure chambers 61 communicated with the common flow channels 60. The common flow channels 60 and the pressure chambers 61 are formed by performing dicer processing, sandblasting, or the like on the actuator plate 53.

The pressure chambers 61 are arranged in the X direction at intervals. The pressure chambers 61 are each formed like a groove which opens on a lower surface of the actuator plate 53, and which linearly extends in the Y direction. The pressure chambers 61 are each formed to have a rectangular shape viewed from the Y direction. Portions of the actuator plate 53, the portions being located between the pressure chambers 61 adjacent to each other, function as partition walls 64*a*, 64*b*. It should be noted that the pressure chambers 61 can each have a trapezoidal shape, a triangular shape, a semicircular shape, or the like when viewed from the Y direction. Further, the configuration in which an extension direction of the pressure chambers 61 coincides with the Y direction will be described in the first embodiment, but the extension direction of the pressure chambers 61 can cross the Y direction.

The common flow channels 60 include an entrance-side common flow channel 60*a* and an exit-side common flow channel 60*b*.

The entrance-side common flow channel 60*a* extends in the X direction in a portion of the actuator plate 53, the portion being located at the +Y side with respect to the pressure chambers 61. The entrance-side common flow channel 60*a* penetrates the actuator plate 53 in the Z direction. To the entrance-side common flow channel 60*a*, there are coupled +Y-side end portions of the respective pressure chambers 61. Thus, the ink flowing through the entrance-side common flow channel 60*a* is delivered to the respective pressure chambers 61. A −X-side end portion in the entrance-side common flow channel 60*a* is coupled to an entrance port (not shown). The ink located in the ink tank 4 is supplied to the entrance-side common flow channel 60*a* through the entrance port.

The exit-side common flow channel 60*b* extends in the X direction in a portion of the actuator plate 53, the portion being located at the −Y side with respect to the pressure chambers 61. The exit-side common flow channel 60*b* penetrates the actuator plate 53 in the Z direction. To the exit-side common flow channel 60*b*, there are coupled −Y-side end portions of the respective pressure chambers 61. Thus, the ink having passed through the pressure chambers 61 is returned to the exit-side common flow channel 60*b*. A +X-side end portion in the exit-side common flow channel 60*b* is coupled to an exit port (not shown). The ink flowing through the exit-side common flow channel 60*b* is returned to the inside of the ink tank 4 through the exit port.

The first film 52 is fixed to the actuator plate 53 with bonding or the like. The first film 52 is arranged along the lower surface of the actuator plate 53 and inner surfaces of the pressure chambers 61. The first film 53 is formed of a material which has an insulating property and ink resistance, and which is elastically deformable. As such a material, the first film 53 is formed of, for example, a resin material (a polyimide type, an epoxy type, a polypropylene type, and so on).

The nozzle plate 51 is fixed to a lower surface of the first film 52 with bonding or the like. The nozzle plate 51 closes the flow channels 60 and the pressure chambers 61 from below. In the first embodiment, the nozzle plate 51 is formed of a metal material such as SUS or Ni—Pd. It should be noted that it is possible for the nozzle plate 51 to have a single layer structure or a laminate structure with a resin material (e.g., polyimide), glass, silicone, or the like besides the metal material.

The nozzle plate 51 is provided with a plurality of nozzle holes 71 penetrating the nozzle plate 51 in the Z direction. The nozzle holes 71 are arranged at intervals in the X direction. The nozzle holes 71 are each communicated with corresponding one of the pressure chambers 61 in a central portion in the X direction and the Y direction. In the first embodiment, each of the nozzle holes 71 is formed to have, for example, a taper shape having an inner diameter gradually decreasing in a direction from the upper side toward the lower side.

The second film 54 is fixed to an upper surface of the actuator plate 53 with bonding or the like. In the first embodiment, the second film 54 covers the entire area of the upper surface of the actuator plate 53. The second film 54 is formed of a material which has an insulating property, and which is elastically deformable. As such a material, it is possible to adopt substantially the same material as that of the first film 53. It should be noted that the second film 54 is not an essential constituent. It is possible for the actuator plate 53 and the cover plate 55 to be bonded to each other via an adhesive layer including, for example, an epoxy adhesive or an acrylic adhesive.

The cover plate 55 is fixed to an upper surface of the second film 54 with bonding or the like with the thickness direction set to the Z direction. The cover plate 55 is thicker in thickness in the Z direction than the actuator plate 53 and the films 52, 54. In the first embodiment, the cover plate 55 is formed of a material (e.g., metal oxide, glass, resin, or ceramics) having an insulating property.

Figure 4:
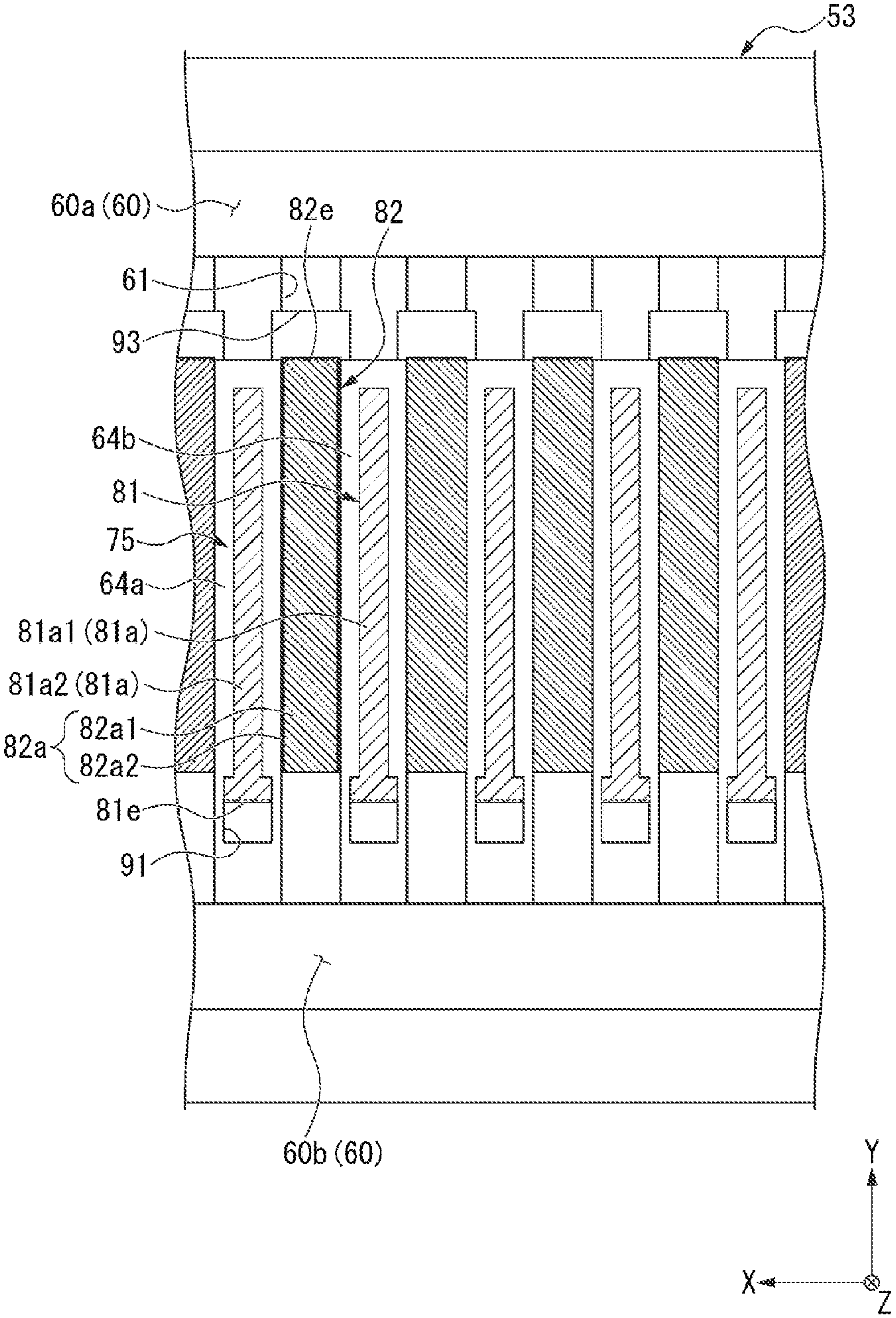
FIG. 4 is a bottom view of an actuator plate related to the first embodiment.
Figure 5:
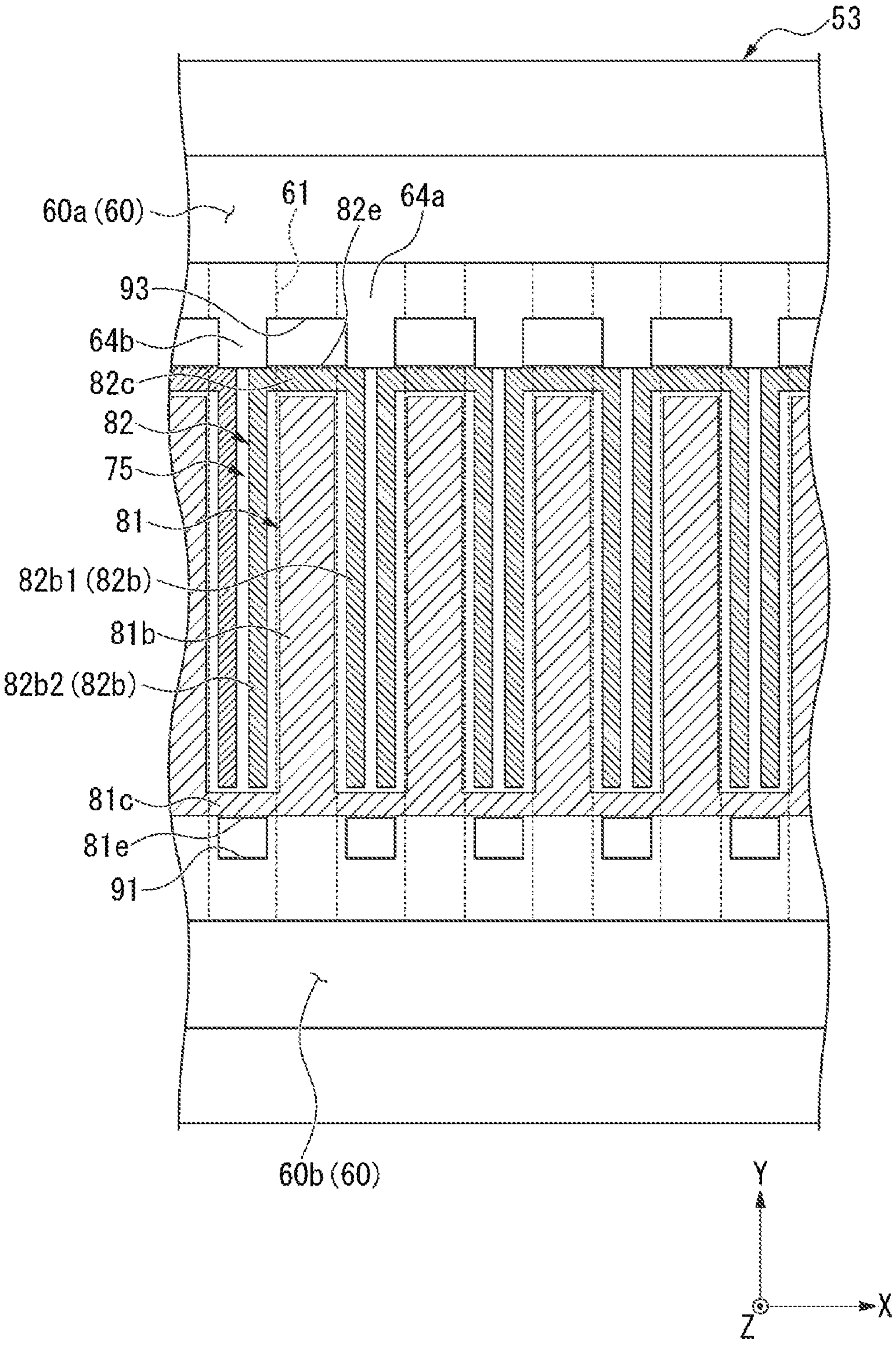
FIG. 5 is a plan view of the actuator plate related to the first embodiment.
Figure 6:
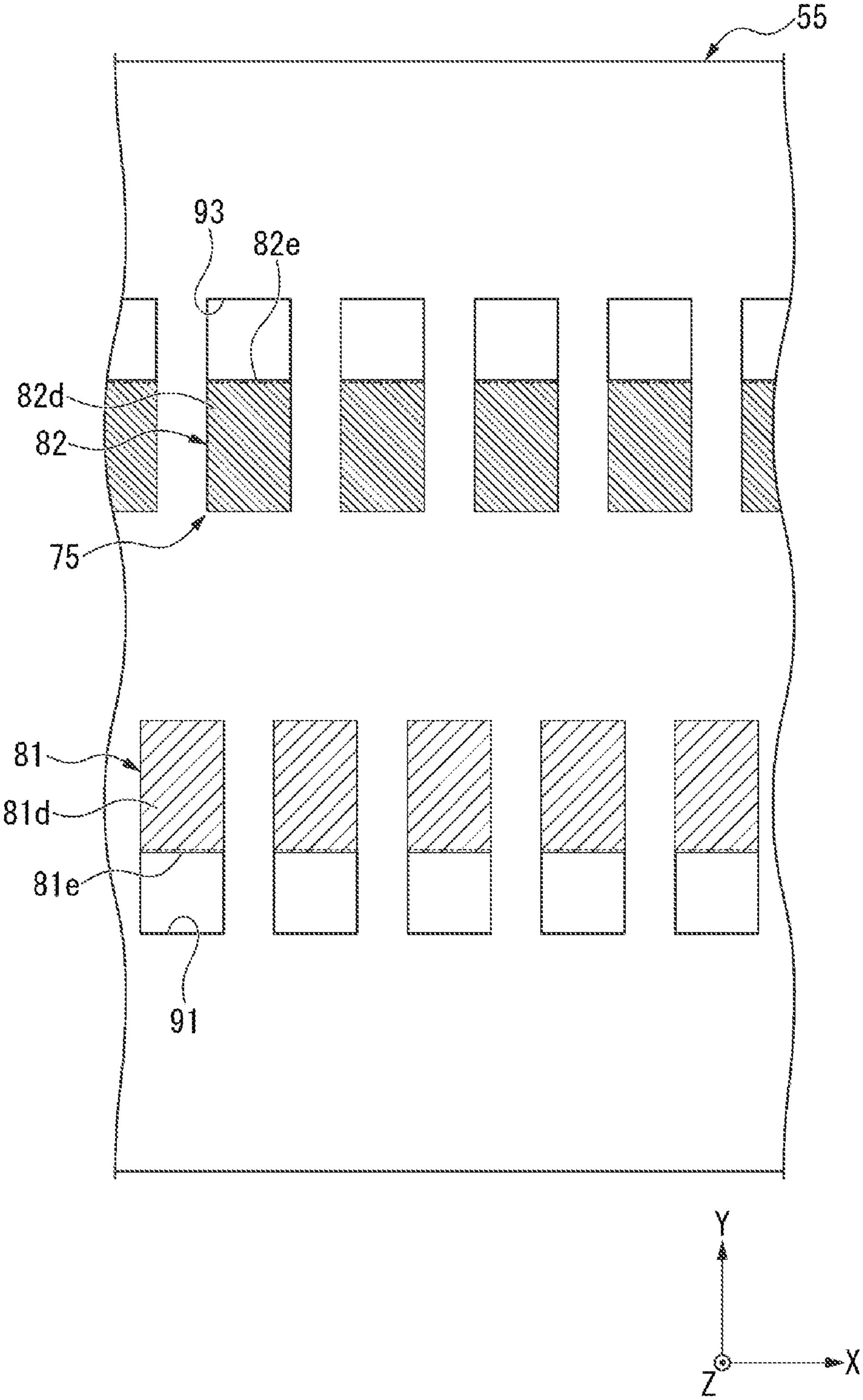
FIG. 6 is a plan view of a cover plate related to the first embodiment.

Subsequently, a structure of the drive interconnections 75 will be described. FIG. 4 is a bottom view of the actuator plate 53. FIG. 5 is a plan view of the actuator plate 53. FIG. 6 is a plan view of the cover plate 55. The drive interconnections 75 are disposed so as to correspond to the pressure chambers 61. The drive interconnections 75 corresponding to the pressure chambers 61 adjacent to each other have respective configurations substantially the same as each other. In the following description, the drive interconnections 75 disposed so as to correspond to one pressure chamber 61 out of the plurality of pressure chambers 61 are explained as an example, and the description of the drive interconnections 75 corresponding to the other pressure chambers 61 will arbitrarily be omitted. It should be noted that the drive interconnections 75 are formed by evaporating the electrode material from both of the upper and lower sides of the actuator plate 53.

As shown in FIG. 3 through FIG. 6, the drive interconnections 75 consist of common interconnections 81 and individual interconnections 82.

The common interconnections 81 are each provided with a first common electrode 81*a*, a second common electrode 81*b*, a patterned interconnection 81*c*, a common pad 81*d*, and a through interconnection 81*e*.

As shown in FIG. 3 and FIG. 4, the first common electrode 81*a* is formed at a position overlapping the partition wall 64 when viewed from the Z direction on a lower surface of the actuator plate 53. Specifically, in the first common electrodes 81*a*, the first common electrode 81*a* (hereinafter referred to as a +X-side common electrode 81*a*1) located at the +X side overlaps the partition wall 64*a*. Meanwhile, in the first common electrodes 81*a*, the first common electrode 81*a* (hereinafter referred to as a −X-side common electrode 81*a*2) located at the −X side overlaps the partition wall 64*b*. The first common interconnections 81*a* linearly extend in the Y direction along the pressure chamber 61. In the present embodiment, the +X-side common electrode 81*al* corresponding to one pressure chamber 61 is also used as the −X-side common electrode 81*a*2 of another pressure chamber 61 adjacent at the +X side to the one pressure chamber 61. Meanwhile, the −X-side common electrode 81*a*2 corresponding to one pressure chamber 61 is also used as the +X-side common electrode 81*al* of another pressure chamber 61 adjacent at the −X side to the one pressure chamber 61.

As shown in FIG. 3 and FIG. 5, the second common electrode 81*b* is arranged at a position which overlaps corresponding one of the pressure chambers 61 when viewed from the Z direction, and which fails to overlap the first common electrode 81*a* when viewed from the Z direction on the upper surface of the actuator plate 53. In the illustrated example, the second common electrode 81*b* is formed in a region including a central portion in the X direction in the pressure chamber 61. The second common interconnection 81*a* linearly extends in the Y direction along the pressure chamber 61. It should be noted that the width in the X direction and so on of the second common electrode 81*b* can arbitrarily be changed providing the second common electrode 81*b* is formed at the position overlapping the pressure chamber 61 when viewed from the Z direction.

The patterned interconnection 81*c* is coupled to the second common electrode 81*b* on the upper surface of the actuator plate 53. The patterned interconnection 81*c* extends in the X direction in a state of being coupled to the −Y-side end portion in the second common electrode 81*b*. In the first embodiment, the patterned interconnection 81*c* couples the second common electrodes 81*b* of the drive interconnections 75 in a lump. It should be noted that it is possible for the patterned interconnection 81*c* to individually couple the second common electrodes 81*b* of the drive interconnections 75 to each other.

As shown in FIG. 6, the common pads 81*d* are formed on the upper surface of the cover plate 55. The common pads 81*d* each extend in the Y direction on a portion of the upper surface of the cover plate 55, the portion overlapping the pressure chamber 61 when viewed from the Z direction.

As shown in FIG. 4 through FIG. 6, the through interconnection 81*e* couples the first common electrode 81*a*, the second common electrode 81*b*, the patterned interconnection 81*c*, and the common pad 81*d* to each other. The through interconnection 81*e* is disposed so as to penetrate the actuator plate 53, the second film 54, and the cover plate 55 in the Z direction. Specifically, a common interconnecting hole 91 is formed in a portion of the actuator plate 53, the second film 54, and the cover plate 55, the portion being located at the −Y side with respect to the common electrodes 81*a*, 81*b*. The common interconnecting hole 91 is individually formed so as to correspond to each of the pressure chambers 61. A −Y-side end edge in each of the first common electrode 81*a*, the patterned interconnection 81*c*, and the common pad 81*d* is coupled to the through interconnection 81*e* in an opening edge of the common interconnecting hole 91. It should be noted that the through interconnection 81*e* and the common interconnecting hole 91 can be disposed in a lump to the pressure chambers 61. In this case, the common interconnecting hole 91 extends in the X direction with the length sufficient to straddle the pressure chambers 61.

As shown in FIG. 3 through FIG. 6, the individual interconnections 82 are each provided with a first individual electrode 82*a*, second individual electrodes 82*b*, a patterned interconnection 82*c*, an individual pad 82*d*, and a through interconnection 82*e*.

As shown in FIG. 3 and FIG. 4, the first individual electrode 82*a* generates a potential difference from the first common electrode 81*a*, and at the same time, generates a potential difference from the second common electrode 81*b*. The first individual electrode 82*a* is formed on inner surfaces of the pressure chamber 61. At least a part of the first individual electrode 82*a* overlaps the second common electrode 81*b* when viewed from the Z direction. The first individual electrode 82*a* extends in the Y direction in a state at a distance in the X direction from each of the first common electrodes 81*a*.

The first individual electrode 82*a* consists of a bottom-surface electrode 82*a*1 and side-surface electrodes 82*a*2.

The bottom-surface electrode 82*a*1 is formed throughout the entire area of the bottom surface 61*a* (a surface facing downward) of the pressure chamber 61.

The side-surface electrode 82*a*2 is formed throughout the entire area on each of a pair of inner side surfaces 61*b* opposed in the X direction to each other out of the inner surfaces of the pressure chamber 61. An upper end edge of each of the side-surface electrodes 82*a*2 is coupled to the bottom-surface electrode 82*a*1. It should be noted that it is sufficient for the first individual electrode 82*a* to be formed on at least a part of the inner surfaces of the pressure chamber 61. Further, the first individual electrode 82*a* can be connected to a portion of the lower surface of the actuator plate 53 (the partition wall 64), the portion being located on the periphery of the pressure chamber 61 in addition to the inner surfaces of the recessed part 61.

As shown in FIG. 3 and FIG. 5, the second individual electrode 82*b* generates a potential difference from the second common electrode 81*b*, and at the same time, generates a potential difference from the first common electrode 81*a*. The second individual electrodes 82*b* are respectively formed in portions on the upper surface of the actuator plate 53, the portions being located at both sides in the X direction with respect to the second common electrode 81*b*. The second individual electrodes 82*b* each extend in the Y direction in a state at a distance in the X direction from the second common electrode 81*b*. The width in the X direction in the second individual electrode 82*b* is narrower than the width in the X direction in the first common electrodes 81*a*.

Out of the second individual electrodes 82*b*, the second individual electrode 82*b* (hereinafter referred to as a +X-side individual electrode 82*b*1) located at the +X side generates a potential difference from the +X-side common electrode 81*a*1. A part of the +X-side individual electrode 82*b*1 overlaps the partition wall 64*a* when viewed from the Z direction. The +X-side individual electrode 82*b*1 is opposed to the +X-side common electrode 81*a*1 in the Z direction on the partition wall 64*a*.

Out of the second individual electrodes 82*b*, the second individual electrode 82*b* (hereinafter referred to as a −X-side individual electrode 82*b*2) located at the −X side generates a potential difference from the −X-side common electrode 81*a*2. A part of the −X-side individual electrode 82*b*1 overlaps the partition wall 64*b* when viewed from the Z direction. The −X-side individual electrode 82*b*2 is opposed to the −X-side common electrode 81*a*2 in the Z direction on the partition wall 64*b*. It should be noted that between the pressure chambers 61 adjacent to each other, the +X-side individual electrode 82*b*1 in one pressure chamber 61 and the −X-side individual electrode 82*b*2 in the other pressure chamber 61 are at a distance in the X direction from each other on the side walls 62*a*, 62*b*.

As shown in FIG. 5, the patterned interconnection 82*c* couples the +Y-side end portions of the respective second individual electrodes 82*b* to each other, the second individual electrodes 82*b* corresponding to each other in each of the pressure chambers 61, on the upper surface of the actuator plate 53.

As shown in FIG. 6, the individual pads 82*d* are formed on the upper surface of the cover plate 55. The individual pads 82*d* each extend in the Y direction on a portion of the upper surface of the cover plate 55, the portion overlapping the pressure chamber 61 when viewed from the Z direction.

As shown in FIG. 4 through FIG. 6, the through interconnection 82*e* couples the first individual electrode 82*a*, the second individual electrode 82*b*, the patterned interconnection 82*c*, and the individual pad 82*d* to each other. The through interconnection 82*e* is disposed so as to penetrate the actuator plate 53 in the Z direction. Specifically, an individual interconnecting hole 93 is formed in a portion of the actuator plate 53, the second film 54, and the cover plate 55, the portion being located at the +Y side with respect to the first individual electrode 82*a*. The individual interconnecting hole 93 is individually formed so as to correspond to each of the pressure chambers 61. A +Y-side end edge in each of the first individual electrode 82*a*, the patterned interconnection 82*c*, and the individual pad 82*d* is coupled to the through interconnection 82*e* in an opening edge of the individual interconnecting hole 93. It should be noted that the individual interconnecting hole 93 can be disposed in a lump to the pressure chambers 61.

As shown in FIG. 3, in the drive interconnections 75, portions facing downward are covered with the first film 52. Specifically, in the drive interconnections 75, the first common electrodes 81*a*, the first individual electrodes 82*a*, the patterned interconnections 81*c*, 82*c*, and the through interconnections 81*e*, 82*e* are covered with the first film 52. The first film 52 closes a lower end opening part of each of the common interconnecting holes 91 and the individual interconnecting holes 93 from below. Thus, the communication between the pressure chamber 61 and each of the interconnecting holes 91, 93 is blocked. Meanwhile, in the drive interconnection 75, a portion facing upward is covered with the second film 54. Specifically, in the drive interconnections 75, the second common electrodes 81*b*, the second individual electrodes 82*b*, and the through interconnections 81*e*, 82*e* are covered with the second film 54.

To the upper surface of the cover plate 55, there is pressure-bonded a flexible printed board (not shown). The flexible printed board is mounted on the common pads 81*d* and the individual pads 82*d* on the upper surface of the cover plate 55.

[Operation Method of Printer 1]

Then, there will hereinafter be described when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is provided a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. Further, by the carriage 29 moving in the Y direction at the same time, the inkjet heads 5 mounted on the carriage 29 reciprocate in the Y direction.

While the inkjet heads 5 make the reciprocal motion, the ink is arbitrarily ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such a recirculating side-shoot type inkjet head 5 as in the first embodiment, first, by making the pressure pump 24 and the suction pump 25 shown in FIG. 2 operate, the ink is circulated in the circulation flow channel 23. In this case, the ink circulating through the ink supply tube 21 is supplied to the inside of each of the pressure chambers 61 through the entrance-side common flow channel 60*a*. The ink supplied to the inside of each of the pressure chambers 61 circulates through that pressure chamber 61 in the Y direction. Subsequently, the ink is discharged to the exit-side common flow channel 60*b*, and is then returned to the ink tank 4 through the ink discharge tube 22. Thus, it is possible to circulate the ink between the inkjet head 5 and the ink tank 4.

Then, when the reciprocation of the inkjet heads 5 is started due to the translation of the carriage 29 (see FIG. 1), the drive voltages are applied between the common electrodes 81*a*, 81*b* and the individual electrodes 82*a*, 82*b* via the flexible printed boards. On this occasion, the common electrodes 81*a*, 81*b* are set at a reference potential GND, and the individual electrodes 82*a*, 82*b* are set at a drive potential Vdd to apply the drive voltage.

Figure 7:
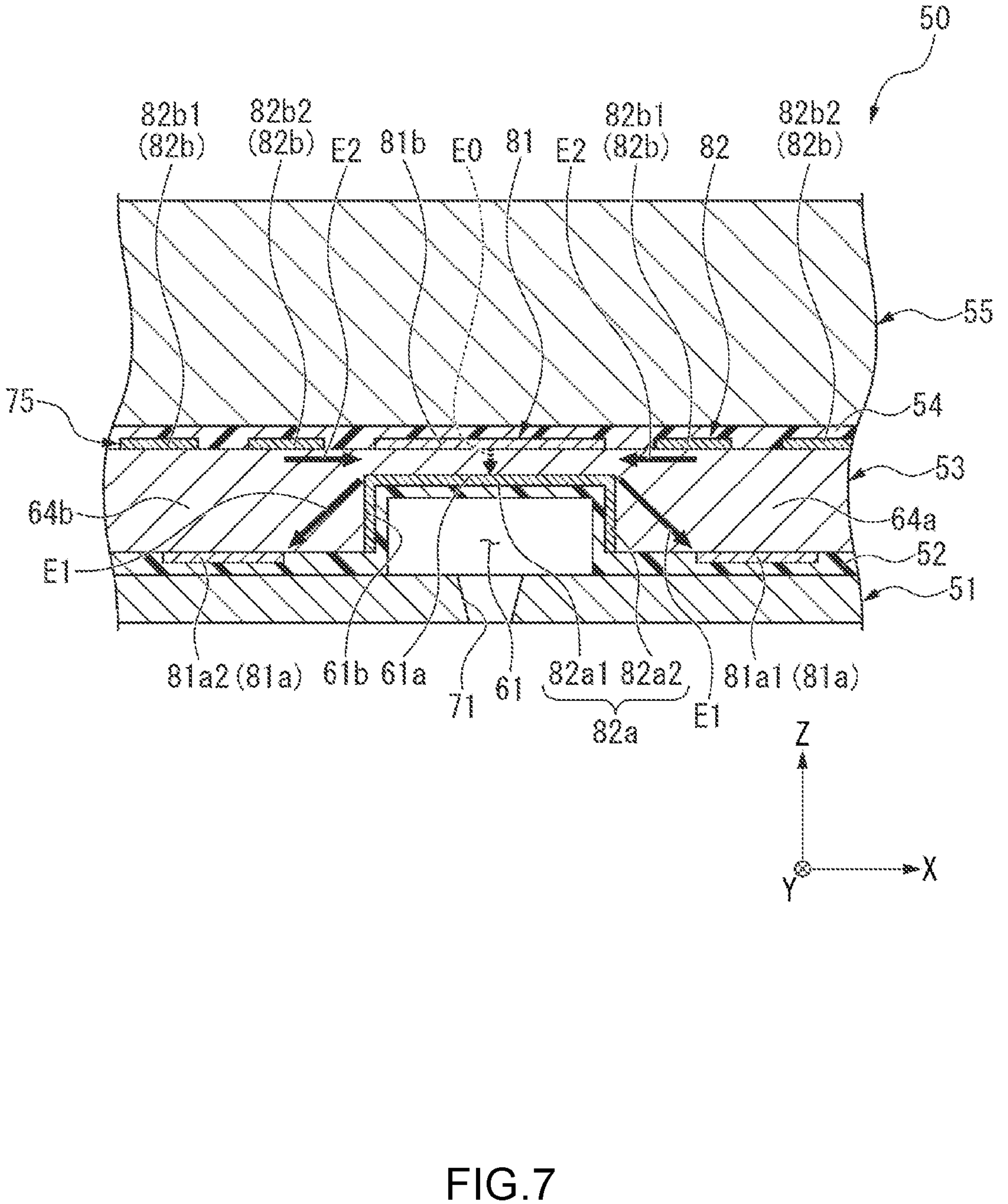
FIG. 7 is an explanatory diagram for explaining a behavior of deformation when ejecting ink regarding the head chip according to the first embodiment.

FIG. 7 is an explanatory diagram for explaining a behavior of deformation when ejecting the ink regarding the head chip 50.

As shown in FIG. 7, due to the application of the drive voltage, the potential difference occurs in the X direction between the first common electrodes 81*a* and the first individual electrode 82*a*, and between the second common electrode 81*b* and the second individual electrodes 82*b*. Due to the potential difference generated in the X direction, the thickness-shear deformation occurs in the actuator plate 53 in the Z direction in the shear mode. Specifically, between the first common electrodes 81*a* and the first individual electrode 82*a*, there occurs the electric field in a direction of getting away from each other in the X direction (see the arrows E1). Further, on the upper surface of the actuator plate 53, between the second common electrode 81*b* and the second individual electrodes 82*b*, there occurs the electric field in a direction of coming closer to each other in the X direction (see the arrows E2). As a result, in the actuator plate 53, a shear deformation occurs upward in a direction from the both end portions toward the central portion in the X direction in a portion corresponding to each of the pressure chambers 61. In particular, in the present embodiment, since the side-surface electrodes 82*a*2 are formed on the inner side surfaces 61*b* of the pressure chamber 61, the electric field is generated in a state of facing downward in a direction toward the outside in the X direction due to the potential difference generated between the side-surface electrodes 82*a*2 and the first common electrode 81*a*. Therefore, the partition walls 64*a*, 64*b* are apt to deform outward in the X direction and upward.

Meanwhile, the potential difference occurs in the Z direction between the first common electrodes 81*a* and the second individual electrodes 82*b*, and between the first individual electrode 82*a* and the second common electrode 81*b*. Due to the potential difference having occurred in the Z direction, an electric field occurs (see the arrow E0) in the actuator plate 53 in a direction parallel to the polarization direction (the Z direction). As a result, a stretch deformation occurs in the actuator plate 53 in the Z direction in a bend mode. In other words, in the head chip 50 according to the first embodiment, it results in that both of the deformation caused by the shear mode and the deformation caused by the bend mode in the actuator plate 53 occur in the Z direction. Specifically, due to the application of the drive voltage, the actuator plate 53 deforms in a direction of getting away from the pressure chamber 61. Thus, the volume in the pressure chamber 61 expands. Subsequently, when making the drive voltage zero, the actuator plate 53 is restored to thereby urge the volume in the pressure chamber 61 to be restored. In the process in which the actuator plate 53 is restored, the pressure in the pressure chamber 61 increases, and thus, the ink in the pressure chamber 61 is ejected outside through the nozzle hole 71. By the ink ejected outside landing on the recording target medium P, print information is recorded on the recording target medium P.

Here, the head chip 50 according to the first embodiment is provided with the configuration provided with the drive electrodes (the common electrodes 81*a*, 81*b* and the individual electrodes 82*a*, 82*b*) which generate the electric field in the actuator plate 53 to thereby deform the actuator plate 53 in the Z direction (the thickness direction) and the X direction (a crossing direction) to expand or contract the volume of the pressure chamber 61.

According to this configuration, by forming the pressure chamber 61 with the actuator plate 53, it is possible to prevent the elastic energy from being absorbed by the deformation of other members when the pressure in the pressure chamber 61 changes due to the deformation of the actuator plate 53 compared to when, for example, forming the pressure chamber in a separate member from the actuator plate 53. Thus, it is possible to effectively transfer the elastic energy to the ink in the pressure chamber 61 to increase the pressure to be generated by the pressure chamber 61. Further, compared to when forming the pressure chamber in the separate member, it is possible to achieve an increase in manufacturing efficiency and a reduction in cost.

On that basis, in the first embodiment, by the actuator plate 53 being deformed by the drive electrodes in the Z direction and the X direction, it is possible to ensure the pressure to be generated compared to the configuration in which, for example, the actuator plate 53 is deformed in only either one of the Z direction and the X direction.

In the head chip 50 according to the first embodiment, there is adopted the configuration provided with the first individual electrodes (first electrodes) 82*a* formed on the inner surfaces of the pressure chambers 61, the first common electrodes (second electrodes) 81*a* formed on the lower surface (a first surface) of the actuator plate 53, and the second common electrodes (second electrodes) 81*b* disposed so as to be opposed to the first individual electrodes 82*a* on the upper surface (a second surface) of the actuator plate 53.

According to this configuration, by generating the potential difference between the first individual electrodes 82*a* and the first common electrodes 81*a*, it is possible to generate the electric field in a direction crossing the polarization direction of the actuator plate 53. Thus, by deforming the actuator plate 53 in the X direction in the shear mode (the roof-shoot type), it is possible to change the volume of the pressure chamber 61. Further, by generating the potential difference between the first individual electrode 82*a* and the second common electrode 81*b*, it is possible to generate the electric field also in the polarization direction of the actuator plate 53. Thus, by deforming the actuator plate 53 in the Z direction in the bend mode (a bimorph type), it is possible to change the volume of the pressure chamber 61. In other words, by deforming the actuator plate 53 in the Z direction and the X direction in both of the shear mode and the bend mode, it is possible to increase the pressure to be generated in the pressure chamber 61 when ejecting the ink.

In the head chip 50 according to the first embodiment, there is adopted the configuration in which the drive electrodes are provided with the second individual electrodes (second opposed electrodes) 82*b* disposed so as to be opposed to the first common electrodes 81*a* on the upper surface of the actuator plate 53.

According to this configuration, since the second common electrode 81*b* and the second individual electrode 82*b* are formed adjacent to each other on the upper surface of the actuator plate 53, it is possible to deform the actuator plate 53 in the shear mode due to the potential difference generated between the second common electrode 81*b* and the second individual electrode 82*b*.

Further, it is possible to deform the actuator plate 53 in the bend mode due to the potential difference generated between the first common electrode 81*a* and the second individual electrodes 82*b*. As a result, it is possible to achieve a further increase in pressure to be generated, and power saving.

In the head chip 50 according to the first embodiment, there is adopted the configuration in which the polarization direction of the actuator plate 53 is set in one direction throughout the entire length in the Z direction.

According to this configuration, it is possible to achieve simplification of the configuration and the reduction in cost.

Since the inkjet head 5 and the printer 1 according to the first embodiment are each equipped with the head chip 50 described above, it is possible to provide the inkjet head 5 and the printer 1 which are high in quality and capable of exerting the desired ejection performance.

Second Embodiment

Figure 8:
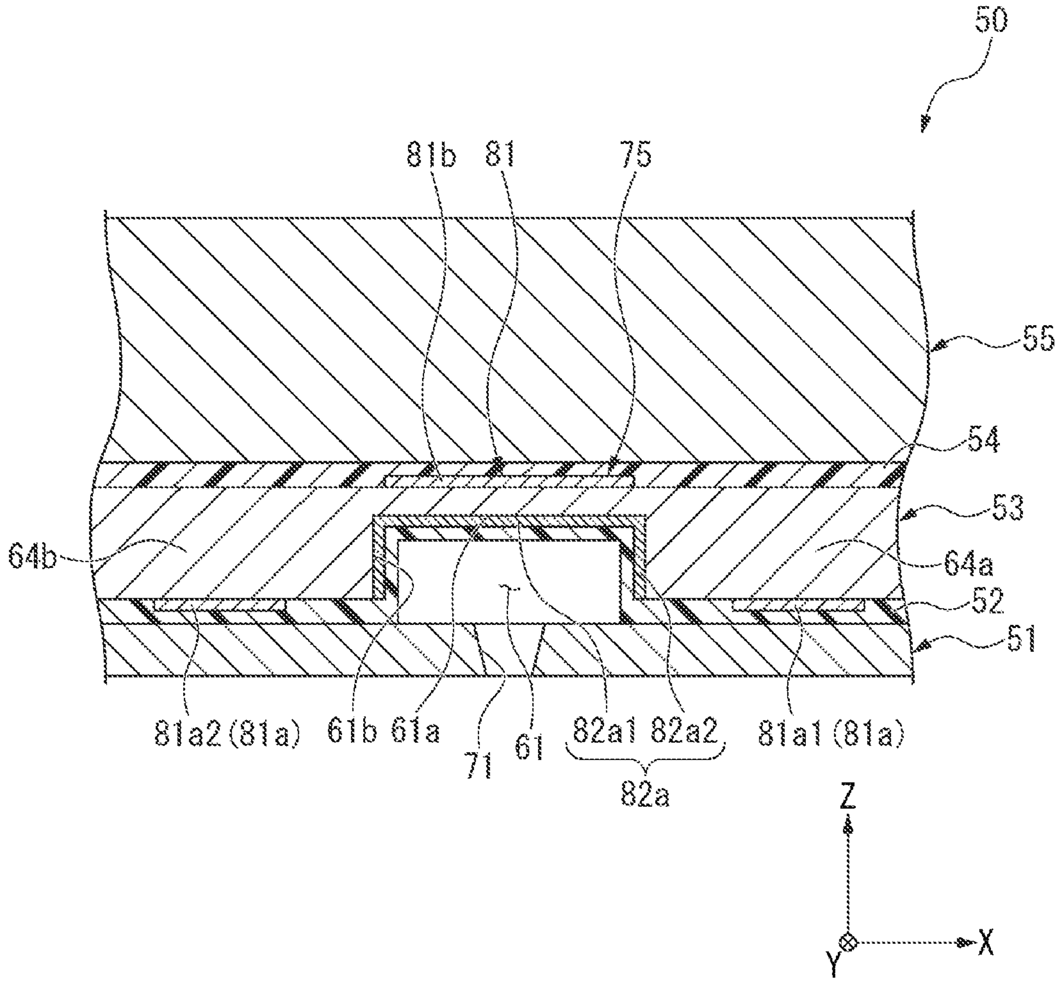
FIG. 8 is a cross-sectional view of a head chip according to a second embodiment.

FIG. 8 is a cross-sectional view of a head chip 50 according to a second embodiment.

As shown in FIG. 8, the head chip 50 according to the second embodiment has a configuration in which the second individual electrodes 82*b* (see FIG. 3) are eliminated from the head chip 50 according to the first embodiment. Therefore, only the second common electrodes 81*b* are formed on the upper surface of the actuator plate 53.

According to the second embodiment, by eliminating the second individual electrodes 82*b*, it is possible to reduce the area of the electrodes, and thus, it is possible to reduce the capacitance of the actuator plate 53. Therefore, it is possible to improve a response characteristic of the actuator plate 53, and at the same time, it is possible to suppress the heat generation in the actuator plate 53.

Third Embodiment

Figure 9:
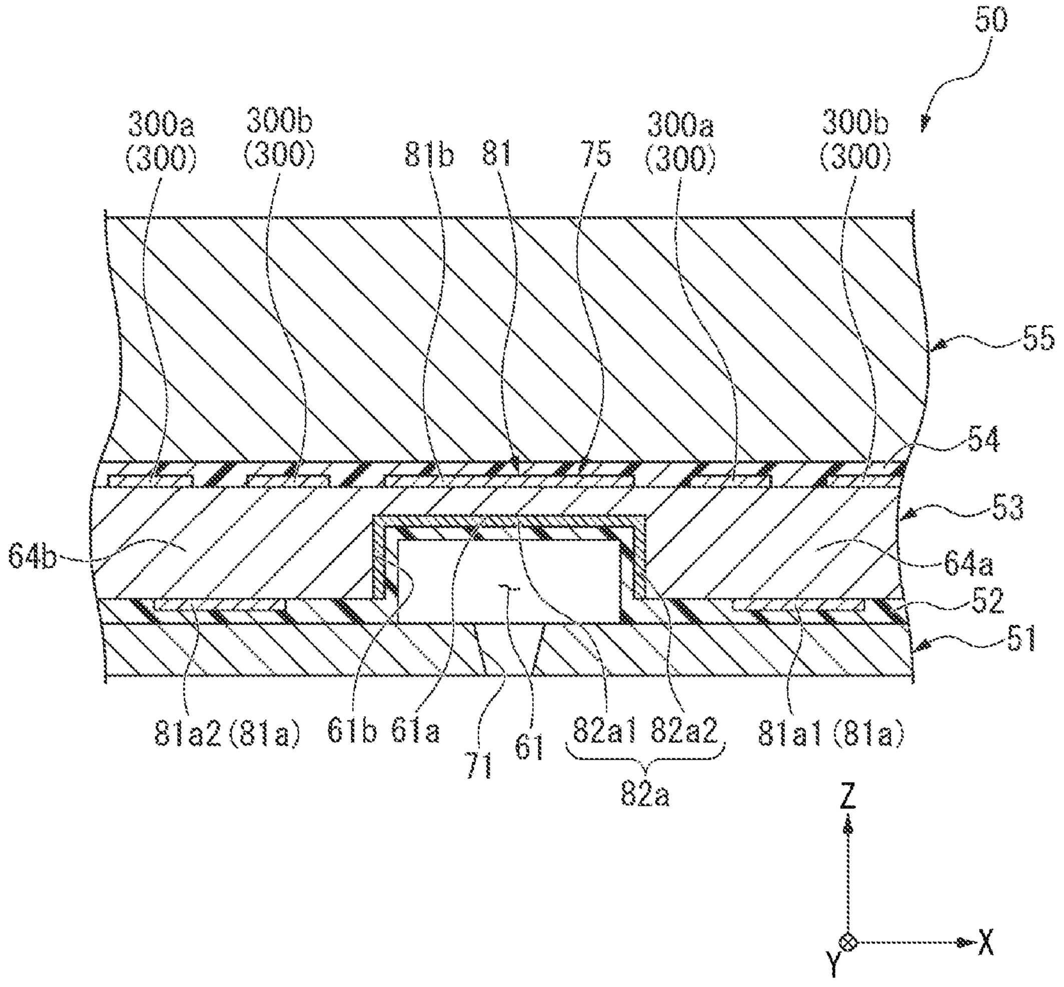
FIG. 9 is a cross-sectional view of a head chip according to a third embodiment.

FIG. 9 is a cross-sectional view of a head chip 50 according to a third embodiment.

In the head chip 50 shown in FIG. 9, at positions on the upper surface of the actuator plate 53, the positions being opposed to the first common electrodes 81*a*, there are formed third common electrodes 300. The third common electrodes 300 are respectively formed in portions located at both sides in the X direction with respect to the second common electrode 81*b*. The third common electrodes 300 extend in the Y direction in a state of being separated in the X direction from the second common electrode 81*b*.

A part of the third common electrode 300*a* located at the +X side out of the third common electrodes 300 overlaps the partition wall 64*a* when viewed from the Z direction. The third common electrode 300*a* is opposed to the +X-side common electrode 81*a*1 in the Z direction on the side wall 62*a*.

A part of the third common electrode 300*b* located at the −X side out of the third common electrodes 300 overlaps the side wall 62*b* when viewed from the Z direction. The third common electrode 300*b* is opposed to the −X-side common electrode 81*a*2 in the Z direction on the partition wall 64*b*. It should be noted that between the pressure chambers 61 adjacent to each other, the third common electrode 300*a* in one pressure chamber 61 and the third common electrode 300*b* in the other pressure chamber 61 are at a distance in the X direction from each other on the partition walls 64*a*, 64*b*.

In the head chip 50 according to the third embodiment, since only the common electrodes (the second common electrodes 81*b* and the third common electrodes 300) are arranged on the upper surface of the actuator plate 53, it is possible to prevent the risk of short circuit on the upper surface of the actuator plate 53. It should be noted that it is possible to integrate the second common electrodes 81*b* and the third common electrodes 300 with each other.

Fourth Embodiment

Figure 10:
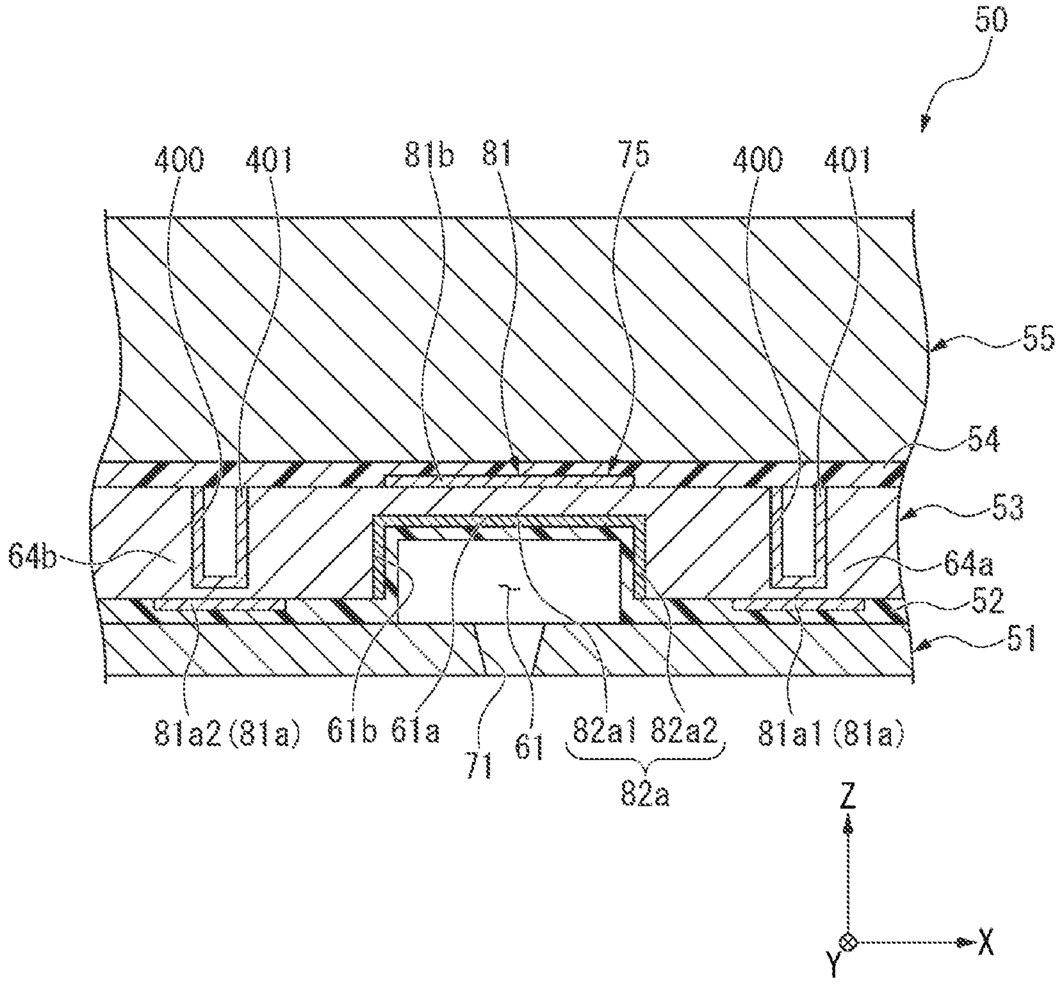
FIG. 10 is a cross-sectional view of a head chip according to a fourth embodiment.

FIG. 10 is a cross-sectional view of a head chip 50 according to a fourth embodiment.

In the head chip 50 shown in FIG. 10, the actuator plate 53 is provided with groove parts 400. The groove parts 400 are formed by recessing the upper surface of the actuator plate 53 downward in portions located at both sides in the X direction with respect to the pressure chambers 61. In the illustrated example, the groove parts 400 are respectively disposed on the actuator plate 53 at both sides in the X direction with respect to the second common electrodes 81*b*.

The depth in the Z direction in the groove part 400 is deeper than the depth in the Z direction in the pressure chambers 61. The width in the X direction of the groove part 400 is narrower than the width in the X direction of the pressure chambers 61. It should be noted that the length in the Y direction in the groove part 400 is made equivalent to the length in the Y direction in the pressure chambers 61. It should be noted that a variety of dimensions of the groove part 400 can arbitrarily be changed.

On inner surfaces of the groove part 400, there is formed a third common electrode (an in-groove electrode) 401. In the present embodiment, the third common electrode 401 is formed throughout the entire area of the inner surfaces of the groove part 400. It should be noted that it is sufficient for the third common electrode 401 to be formed on at least a part of the inner surfaces of the groove part 400.

In the head chip 50 according to the fourth embodiment, the electric field is generated in the actuator plate 53 in a direction crossing the polarization direction due to the potential difference generated between the first individual electrode 82*a* and the third common electrode 401. As a result, a thickness-shear deformation occurs in the partition walls 64*a*, 64*b* so as to fall over outward in the X direction in an upward direction in the shear mode. Thus, when ejecting the ink, the partition walls 64*a*, 64*b* deform so that the volume of the groove part 400 expands or contracts. In other words, since the groove part 400 functions as a clearance part for allowing the deformation of the partition walls 64*a*, 64*b*, it becomes easy to ensure an amount of deformation of the actuator plate 53, and thus, it is possible to increase the pressure to be generated by the pressure chamber 61.

Figure 11:
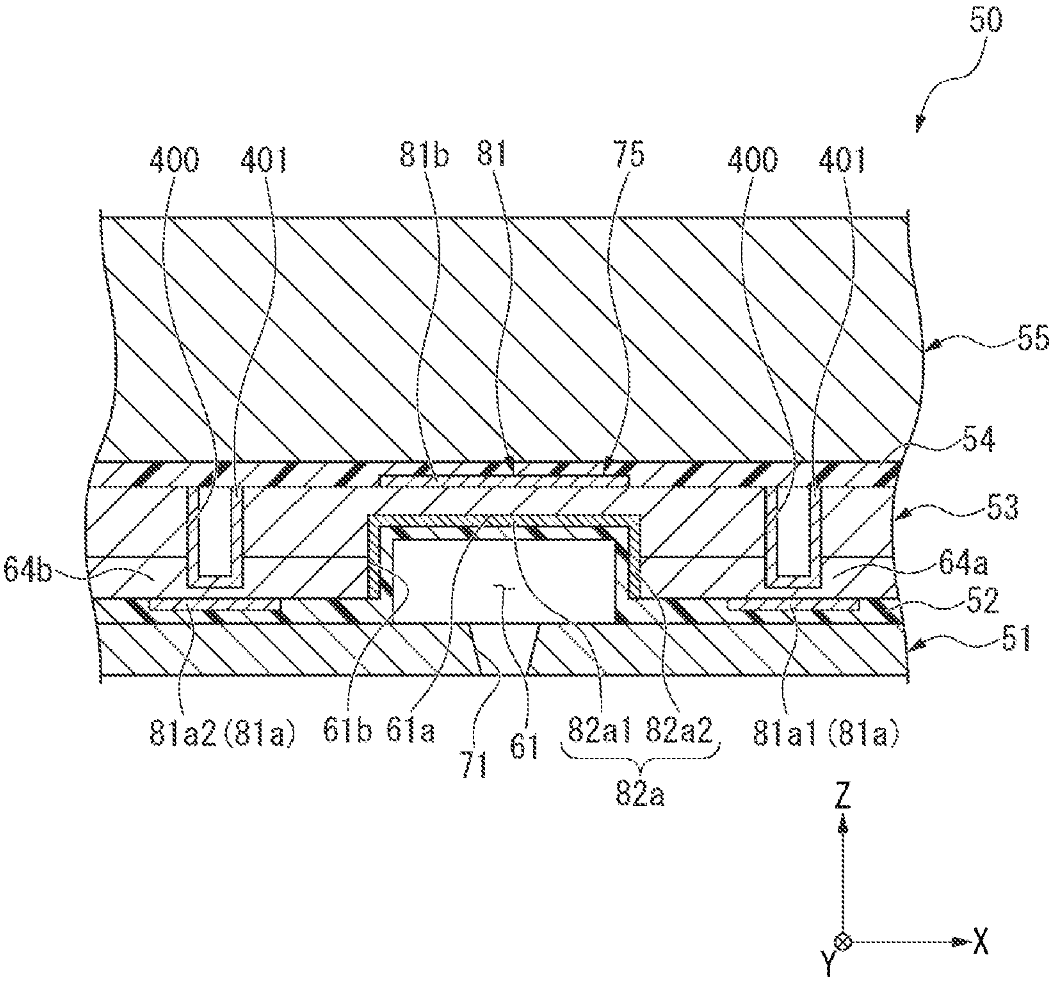
FIG. 11 is a cross-sectional view of a head chip according to a modified example of the fourth embodiment.

It should be noted that in the fourth embodiment, there is described the configuration in which the actuator plate 53 is of the monopole type, but this configuration is not a limitation. As shown in FIG. 11, the actuator plate 53 can be provided with a configuration (a so-called chevron type) in which two piezoelectric plates having respective polarization directions in the Z direction different from (opposed to) each other are stacked. In the illustrated example, in the actuator plate 53, the polarization direction is different between regions divided at a central portion in the Z direction in the pressure chambers 61.

According to this configuration, the electric field is generated in the actuator plate 53 (the piezoelectric plates) in a direction perpendicular to the polarization direction (the Z direction) due to the potential difference generated between the first individual electrode 82*a* and the third common electrode 401. As a result, by the piezoelectric plates making a thickness-shear deformation in the X direction in the shear mode, the partition walls 64*a*, 64*b* make a flexural deformation to form a V-shape from the central portion in the Z direction of the pressure chamber 61. In other words, the partition walls 64*a*, 64*b* deform so that the volume of the pressure chamber 61 expands. Thus, it becomes easy to ensure the amount of deformation in the X direction of the partition walls 64*a*, 64*b* when applying the voltage, and it is easy to ensure the elastic energy of the actuator plate 53.

Figure 12:
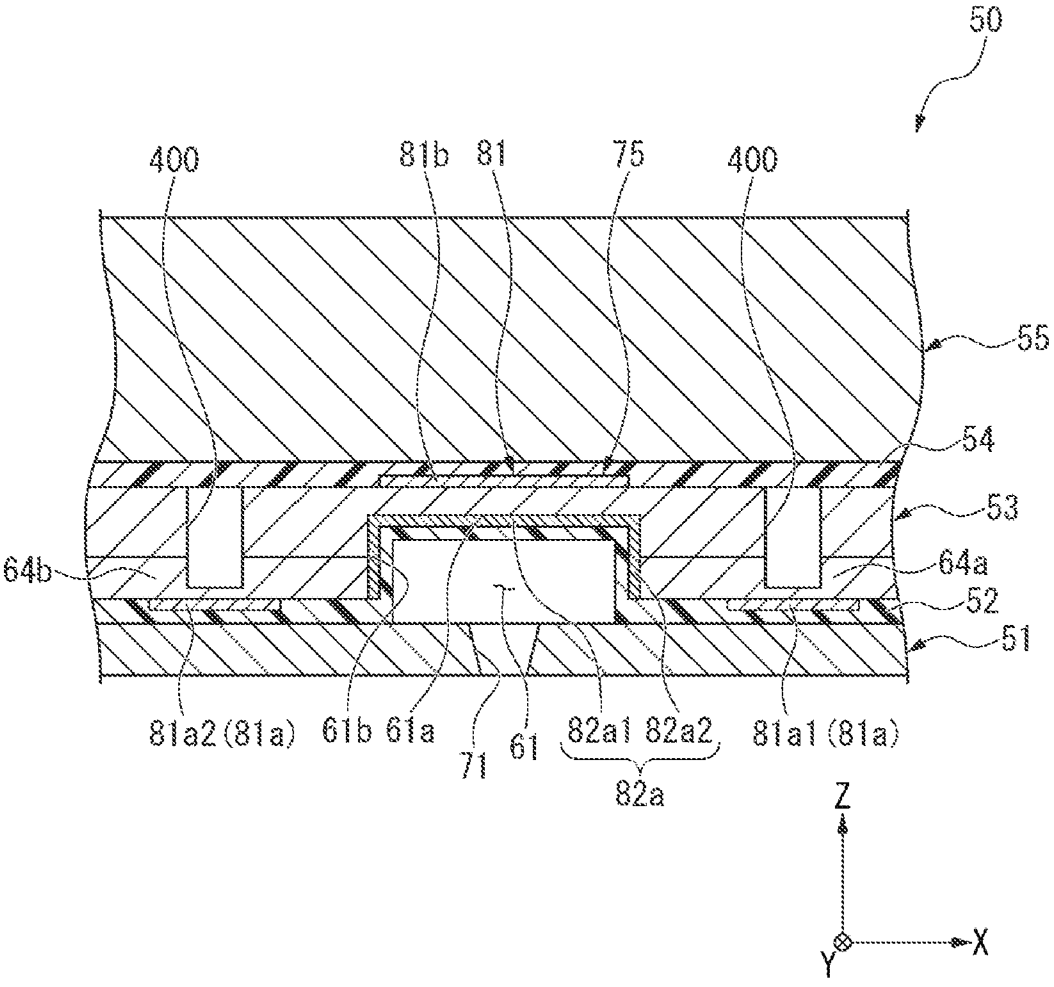
FIG. 12 is a cross-sectional view of a head chip according to a modified example of the fourth embodiment.

Further, in the fourth embodiment, there is described the configuration in which the third common electrode 401 is provided to the groove part 400, but this configuration is not a limitation. For example, as shown in FIG. 12, it is possible to dispose only the groove parts 400 at the both sides in the X direction with respect to the pressure chambers 61 in the actuator plate 53. Also in such a configuration, when the partition walls 64*a*, 64*b* deform, the groove parts 400 function as the clearance parts for allowing the deformation of the partition walls 64*a*, 64*b*. Thus, it becomes easy to ensure the amount of the deformation of the actuator plate 53.

Fifth Embodiment

Figure 13:
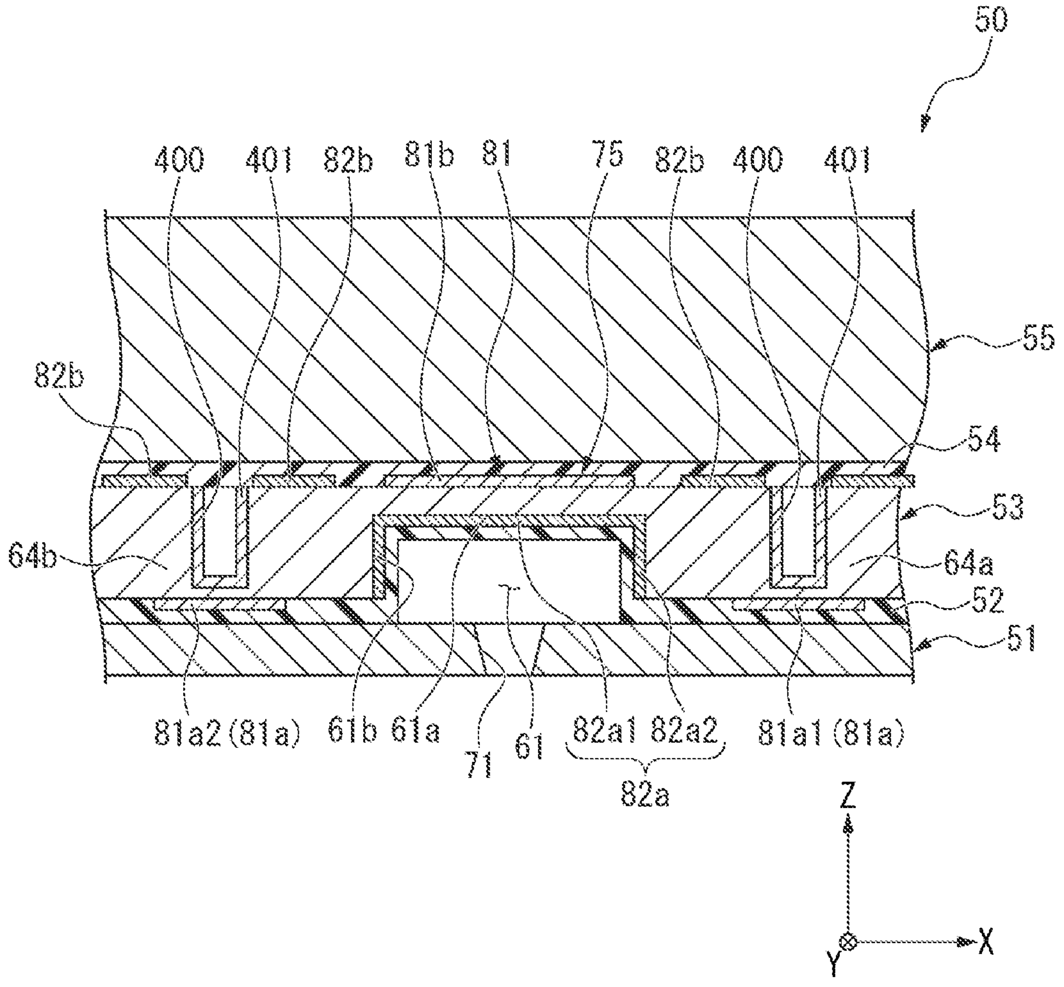
FIG. 13 is a cross-sectional view of a head chip according to a fifth embodiment.

In a head chip 50 shown in FIG. 13, in a portion of the upper surface of the actuator plate 53, the portion being located at an inner side in the X direction with respect to the groove part 400, there is disposed the second individual electrode 82*b*. The second individual electrode 82*b* extends in the Y direction in a state at a distance between the second common electrode 81*b* and the third common electrode 401.

In the fifth embodiment, it is possible to make the thickness-shear deformation in the Z direction in the actuator plate 53 in the shear mode due to the potential difference generated between the second common electrode 81*b* and the second individual electrode 82*b* when ejecting the ink. Thus, it is possible to increase the pressure to be generated in the pressure chamber 61.

Sixth Embodiment

Figure 14:
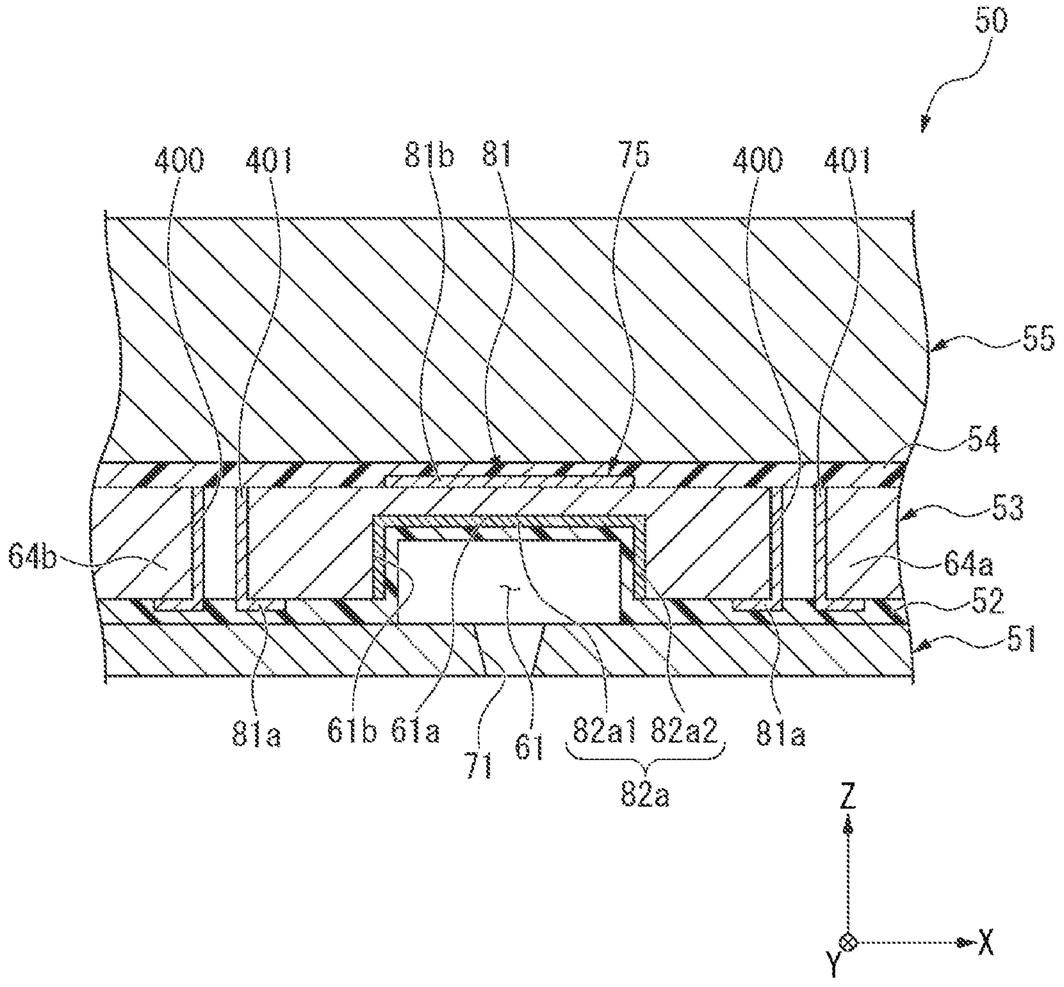
FIG. 14 is a cross-sectional view of a head chip according to a sixth embodiment.

In a head chip 50 shown in FIG. 14, the groove part 400 penetrates the actuator plate 53. In the illustrated example, the third common electrode 401 and the first common electrode 81*a* are integrally connected to each other. It should be noted that the third common electrode 401 and the first common electrode 81*a* can be separated from each other.

Figure 15:
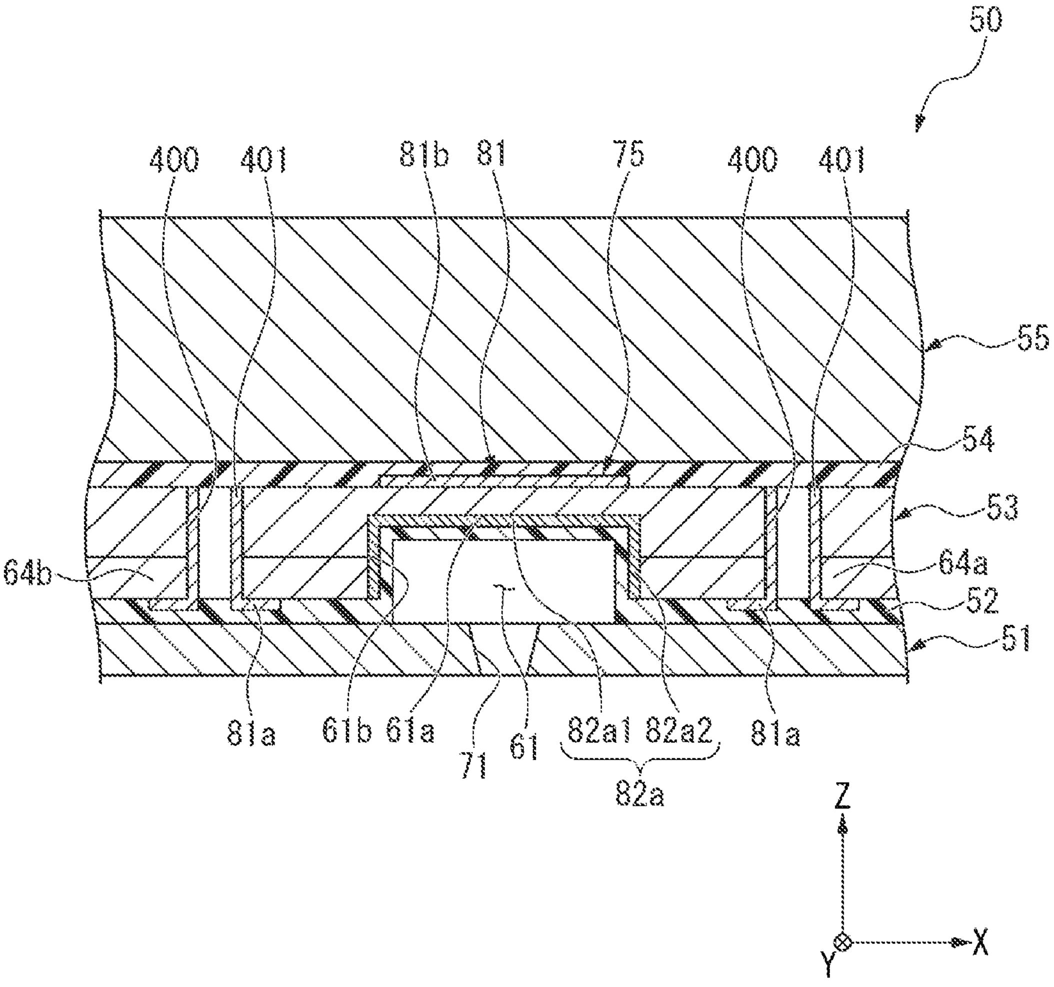
FIG. 15 is a cross-sectional view of a head chip according to a modified example of the sixth embodiment.

In the sixth embodiment, since the groove part 400 penetrates the actuator plate 53, it is easy to allow the deformation of the partition walls 64*a*, 64*b* when ejecting the ink. Therefore, it is possible to increase the pressure to be generated by the pressure chamber 61. It should be noted that regarding the head chip 50 according to the sixth embodiment, it is also possible to use the chevron type as the actuator plate 53 as shown in FIG. 15.

Other Modified Examples

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet heads move with respect to the recording target medium when performing printing as an example, but this configuration is not a limitation. The configuration related to the present disclosure can be adopted as the configuration (a so-called stationary head machine) in which the recording target medium is moved with respect to the inkjet heads in the state in which the inkjet heads are fixed.

In the embodiments described above, there is explained when the recording target medium P is paper, but this configuration is not a limitation. The recording target medium P is not limited to paper, but can also be a metal material or a resin material, and can also be food or the like.

In the embodiments described above, there is explained the configuration in which the liquid jet heads are installed in the liquid jet recording device, but this configuration is not a limitation. Specifically, the liquid to be jetted from the liquid jet heads is not limited to what is landed on the recording target medium, but can also be, for example, a medical solution to be blended during a dispensing process, a food additive such as seasoning or a spice to be added to food, or fragrance to be sprayed in the air.

In the embodiments described above, there is explained the configuration in which the Z direction coincides with the gravitational direction, but this configuration is not a limitation, and it is also possible to set the Z direction to a direction along the horizontal direction.

In the embodiments described above, there is explained the configuration (so-called pulling-shoot) of deforming the actuator plate in the direction of increasing the volume of the pressure chamber due to the application of the voltage, and then restoring the actuator plate to thereby eject the ink, but this configuration is not a limitation. It is possible for the head chip according to the present disclosure to be provided with a configuration (so-called pushing-shoot) in which the ink is ejected by deforming the actuator plate in a direction of reducing the volume of the pressure chamber due to the application of the voltage. When performing the pushing-shoot, the actuator plate deforms so as to bulge toward the inside of the pressure chamber due to the application of the drive voltage. Thus, the volume in the pressure chamber decreases to increase the pressure in the pressure chamber, and thus, the ink located in the pressure chamber is ejected outside through the nozzle hole. When setting the drive voltage to zero, the actuator plate is restored. As a result, the volume in the pressure chamber is restored.

In the embodiments described above, there is described the configuration in which the actuator plate is deformed in the thickness direction and the crossing direction due to the both deformation modes, namely the shear mode and the bend mode, but this configuration is not a limitation. It is possible for the head chip according to the present disclosure to deform the actuator plate in any deformation modes as long as there is adopted the configuration of deforming the actuator plate in the thickness direction and the crossing direction.

In the embodiments described above, there is explained the configuration in which the nozzle plate is directly bonded to the actuator plate, but this configuration is not a limitation. It is possible for the nozzle plate to be bonded to the actuator plate via an intermediate plate or the like.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

an actuator plate provided with a pressure chamber in which a liquid is contained, the pressure chamber is a groove-like structure opening only on the lower surface of the actuator plate and does not extend through in a thickness direction of the actuator plate;

a jet hole plate which has a jet hole communicated with the pressure chamber, and which is overlapped on the actuator plate in a thickness direction of the actuator plate; and a drive electrode which is configured to generate an electric field in the actuator plate to thereby deform the actuator plate in the thickness direction and a crossing direction crossing the thickness direction to expand or contract a volume of the pressure chamber.

2. The head chip according to claim 1, wherein the drive electrode includes a first electrode formed on an inner surface of the pressure chamber, a second electrode which is adjacent in the crossing direction to the first electrode on a first surface of the actuator plate, the first surface facing to the jet hole plate, and which is configured to generate a potential difference from the first electrode, and a first opposed electrode which is disposed on a second surface of the actuator plate so as to be opposed in the thickness direction to the first electrode, the second surface facing to an opposite side to the jet hole plate side, and which is configured to generate a potential difference from the first electrode.

3. The head chip according to claim 2, wherein the drive electrode includes a second opposed electrode which is adjacent to the first opposed electrode on the second surface, and which is disposed so as to be opposed to the second electrode in the thickness direction, and the second opposed electrode is configured to generate a potential difference in the thickness direction from the second electrode, and is configured to generate a potential difference in the crossing direction from the first opposed electrode.

4. The head chip according to claim 2, wherein a groove part recessed in the thickness direction from the second surface is formed in a portion of the actuator plate, the portion being located at an outer side in the crossing direction with respect to the pressure chamber.

5. The head chip according to claim 4, wherein the groove part penetrates the actuator plate in the thickness direction.

6. The head chip according to claim 4, wherein the drive electrode includes an in-groove electrode which is formed on an inner surface of the groove part, and which is configured to generate a potential difference from the first electrode.

7. The head chip according to claim 4, wherein a polarization direction of the actuator plate is set as a direction different between the jet hole plate side with respect to a central portion in the thickness direction in the pressure chamber and an opposite side to the jet hole plate with respect to the central portion in the thickness direction, and the drive electrode is formed throughout an entire length in the thickness direction in the pressure chamber.

8. The head chip according to claim 1, wherein a polarization direction of the actuator plate is set as one direction throughout an entire length in the thickness direction.

9. A liquid jet head comprising:

the head chip according to claim 1.

10. A liquid jet recording device comprising:

the liquid jet head according to claim 9.

* * * * *